United States Patent
Treadway

(10) Patent No.: US 11,586,487 B2
(45) Date of Patent: Feb. 21, 2023

(54) REST APPLICATION PROGRAMMING INTERFACE ROUTE MODELING

(71) Applicant: KYNDRYL, INC., New York, NY (US)

(72) Inventor: Michael Treadway, Keller, TX (US)

(73) Assignee: Kyndryl, Inc., New York, NY (US)

(*) Notice: Subject to any disclaimer, the term of this patent is extended or adjusted under 35 U.S.C. 154(b) by 78 days.

(21) Appl. No.: 16/703,429

(22) Filed: Dec. 4, 2019

(65) Prior Publication Data

US 2021/0173728 A1    Jun. 10, 2021

(51) Int. Cl.
G06F 9/54       (2006.01)
G06F 16/22      (2019.01)

(52) U.S. Cl.
CPC .......... *G06F 9/547* (2013.01); *G06F 16/2246* (2019.01)

(58) Field of Classification Search
CPC .............................. G06F 9/547; G06F 16/2246
See application file for complete search history.

(56) References Cited

U.S. PATENT DOCUMENTS

| | | | |
|---|---|---|---|
| 7,680,785 B2 | 3/2010 | Najork | |
| 7,774,380 B2 | 8/2010 | Burke et al. | |
| 8,001,106 B2 | 8/2011 | Agarwal et al. | |
| 8,073,887 B2 | 12/2011 | Baldwin et al. | |
| 8,577,914 B2 | 11/2013 | Hossain et al. | |
| 8,645,367 B1 * | 2/2014 | Hajaj | G06F 16/951 707/727 |
| 9,215,212 B2 | 12/2015 | Reddy et al. | |
| 10,810,176 B2 * | 10/2020 | Granacher | G06F 16/2386 |
| 2009/0164502 A1 | 6/2009 | Dasgupta et al. | |
| 2009/0210369 A1 * | 8/2009 | Shao | G06F 16/951 706/21 |
| 2011/0040769 A1 * | 2/2011 | Tseng | G06F 16/951 707/750 |
| 2011/0307436 A1 | 12/2011 | Cai et al. | |

(Continued)

FOREIGN PATENT DOCUMENTS

| | | |
|---|---|---|
| CN | 102663022 A | 9/2012 |
| CN | 106357781 | 1/2017 |

OTHER PUBLICATIONS

Kumar, ("Designning APIs with RAML"), Mar. 12, 2017, pp. 1-13. (Year: 2017).*

(Continued)

*Primary Examiner* — S. Sough
*Assistant Examiner* — Phuong N Hoang
(74) *Attorney, Agent, or Firm* — John Kennel; Andrew M. Calderon; Calderon Safran & Cole, P.C.

(57) ABSTRACT

A computer-implemented method includes observing, by a computer device, a plurality of uniform resource locators (URLs); parsing, by the computer device, a URL path of each of the URLs into path segments; creating, by the computer device, a tree structure, the tree structure having a plurality of nodes, each node representing a particular path segment of the path segments; determining, by the computer device, a confidence factor for a first path in the tree structure using a decay function, the first path having an end node; and compacting, by the computer device, sibling nodes of the nodes into a compacted node in response to a number of the sibling nodes exceeding a variance threshold.

20 Claims, 9 Drawing Sheets

(56) References Cited

U.S. PATENT DOCUMENTS

| | | | |
|---|---|---|---|
| 2012/0233188 A1* | 9/2012 | Majumdar | G06F 16/367 |
| | | | 707/756 |
| 2014/0280068 A1* | 9/2014 | Dhoopar | G06F 16/248 |
| | | | 707/722 |
| 2017/0124210 A1* | 5/2017 | Suter | G06N 5/003 |
| 2017/0277756 A1* | 9/2017 | Masuda | G06F 9/5072 |
| 2018/0198839 A1 | 7/2018 | Demulder et al. | |
| 2018/0232533 A1* | 8/2018 | Egorov | G06F 21/6227 |
| 2019/0196890 A1* | 6/2019 | Bucchi | G06F 16/24545 |
| 2019/0327251 A1* | 10/2019 | Muddu | G06N 20/20 |
| 2020/0311156 A1* | 10/2020 | Miao | G06N 20/00 |

OTHER PUBLICATIONS

Vegibit, ("How to add routes and models to node Rest API"), pp. 1-13. (Year: 2013).*

Mell et al., "The NIST Definition of Cloud Computing", NIST, Special Publication 800-145, Sep. 2011, 7 pages.

Google Developers, "The Discovery API provides a list of Google APIs and a machine-readable "Discovery Document" metadata for each API", Google API Discovery Service, downloaded Dec. 4, 2019, 4 pages.

\* cited by examiner

Observations

505 —— GET/service/v1/user/1
510 —— GET/service/v1/user/1
POST/service/v1/user
515 —— GET/service/v1/user/2
520 —— GET/service/v1/user/2/skill
525 —— GET/service/v1/user/2/skill/1
GET/service/v1/skill/1

FIG. 5

$$N(t) = N_0 e^{-\lambda t} \quad \text{Where:} \quad \lambda = 0.5$$
$$t = \text{Relative Level}$$

| Relative Level (t) | $e^{-\lambda t}$ |
| --- | --- |
| 0 | 1.000 |
| 1 | 0.606 |
| 2 | 0.368 |
| 3 | 0.223 |
| 4 | 0.135 |

REST APPLICATION PROGRAMMING INTERFACE ROUTE MODELING

BACKGROUND

Aspects of the present invention relate generally to computer program modeling and, more particularly, to modeling an application programing interface by observing a plurality of uniform resource locators.

Application programming interfaces (APIs) are used in software engineering to help define ways to access and communicate with software programs. For example, an API may define a particular set of rules and specifications that software programs can follow to communicate with each other. APIs may allow an interface between different software programs and facilitate their interaction, similar to the way a user interface facilitates interaction between humans and computers.

Representational State Transfer (REST) is a software architectural style that allows the requesting systems to access and manipulate textual representations of web resources by using a uniform and predefined set of stateless operations. Web service APIs that adhere to the REST architectural constraints are called RESTful APIs. Other kinds of web services, such as SOAP web services, expose their own arbitrary sets of operations.

SUMMARY

In a first aspect of the invention, there is a computer-implemented method including: observing, by a computer device, a plurality of uniform resource locators (URLs); parsing, by the computer device, a URL path of each of the URLs into path segments; creating, by the computer device, a tree structure, the tree structure having a plurality of nodes, each node representing a particular path segment of the path segments; determining, by the computer device, a confidence factor for a first path in the tree structure using a decay function, the first path having an end node; and compacting, by the computer device, sibling nodes of the nodes into a compacted node in response to a number of the sibling nodes exceeding a variance threshold.

In another aspect of the invention, there is a computer program product, the computer program product comprising one or more computer readable storage media having program instructions collectively stored on the one or more computer readable storage media. The program instructions are executable to: observe a plurality of uniform resource locators (URLs); parse a URL path of each of the URLs into path segments; create a tree structure, the tree structure having a plurality of nodes, each node representing a particular path segment of the path segments; determine a confidence factor for a first path in the tree structure using a decay function, the first path having an end node; and compact sibling nodes of the nodes into a compacted node in response to a number of the sibling nodes exceeding a variance threshold.

In another aspect of the invention, there is system including a processor, a computer readable memory, and a computer readable storage medium. The system includes program instructions to: observe a plurality of uniform resource locators (URLs); parse a URL path of each of the URLs into path segments; create a tree structure, the tree structure having a plurality of nodes, each node representing a particular path segment of the path segments; determine a confidence factor for a first path in the tree structure using a decay function, the first path having an end node; and compact sibling nodes of the nodes into a compacted node in response to a number of the sibling nodes exceeding a variance threshold. The program instructions are stored on the computer readable storage medium for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 shows an exemplary list of URLs that are observed by exemplary embodiments of the invention.

FIG. 6 shows an exemplary decay function according to an embodiment of the invention.

DETAILED DESCRIPTION

Figure 1:
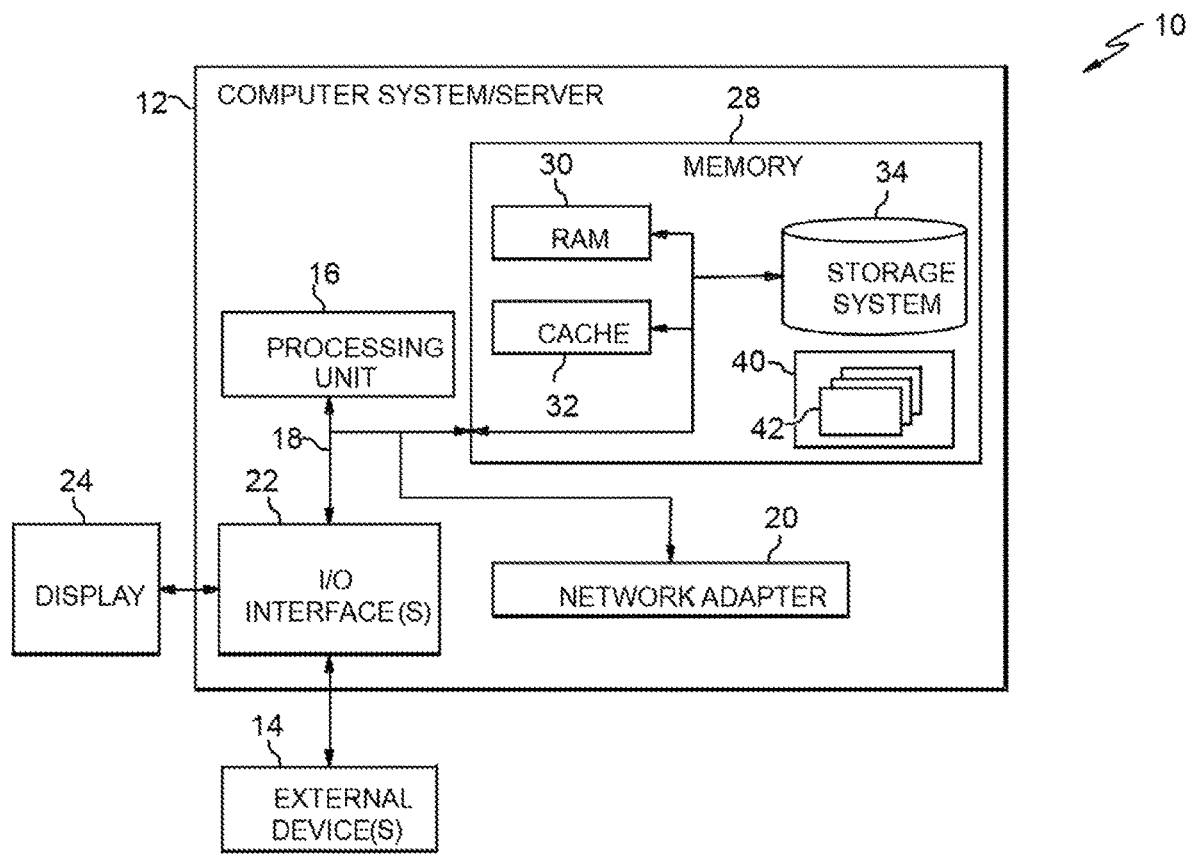
FIG. 1 depicts a cloud computing node according to an embodiment of the present invention.

Aspects of the present invention relate generally to computer program modeling and, more particularly, to modeling an application programing interface by observing a plurality of uniform resource locators. According to aspects of the invention, internet (or other) traffic is observed and analyzed to determine if one or more models can be formed to aid in the production of APIs. In embodiments, the traffic is observed by HTTP proxy. In embodiments, the traffic is gathered by capture logs. Embodiments of the invention are applied to traffic observed in real time. Embodiments of the invention are applied to traffic that has been stored for processing later. In embodiments, the traffic is in the form of a plurality of URLs and the paths of the URLs are parsed into segments. The segments are stored into a tree structure having a plurality of nodes where each node represents a particular one of the path segments. A confidence factor is determined for some or all of the paths through the tree structure using a decay function. The decay function reduces the impact on the confidence factor of nodes (path segments) that are a longer distance from an end node of the path. In embodiments, paths having a confidence factor above a defined threshold are considered good models for an API. In this manner, implementations of the invention produce models for APIs based on the number of example paths used to establish the models, and weights applied to the path segments by the decay function in determining the confidence factor.

Implementations of the invention are improvements to the functioning of a computer. For example, parsing a plurality of URL paths into path segments, storing the path segments into a tree structure, determining a confidence factor for a first path in the tree structure using a decay function, and compacting sibling nodes into a compacted node, to produce API models improves the efficiency of a computer when developing APIs. In addition, implementations of the invention include features that are not well understood, routine, or conventional activity in the relevant art. For example, compacting, by a computer device, sibling nodes into a compacted node in response to a number of the sibling nodes exceeding a variance threshold is not well-understood, routine, or conventional.

Embodiments of the invention include a method for inferring API models/templates based on a sample of API calls. The method includes building a tree structure from API call URLs for an API, where nodes of the tree correspond to URL segments of the URLs, where each leaf-to-root path of the tree corresponds to the URL segments for a single URL, and where each node includes a count of a number of times the node's corresponding URL segment is repeated in the observed URLs; for each leaf-to-root path, calculating a confidence value using an exponential decay function and the respective counts of the nodes in the leaf-to-root path; for each node having a number of child nodes exceeding a variance threshold, replacing all of the child nodes for the node with a single catch-all node; and identifying each remaining leaf-to-root path having a confidence value exceeding a confidence threshold as a model/template for the API.

It is fairly common, but not always guaranteed, for there to be a model available for a RESTful API. Having a model (i.e. OpenAPI specification) can be useful across many domains such as API documentation, code generation, smart caching, etc. However, building and maintaining these models can be costly and keeping the models in sync with reality can be a challenge.

Given the structure and generally accepted rules around the syntax of RESTful APIs, embodiments of the invention observe API usage patterns and infer the underlying resource model. For example, the following API usage patterns can be generalized as follows:

GET/user/472649
GET/user/927403-s8fy2u3
POST/user/28rofh4/promote
generalized to:
GET/users/{ID}
POST/users/{ID}/promote Knowing that all of these APIs interact with the same resource 'user' is useful in caching systems, machine learning, and more.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
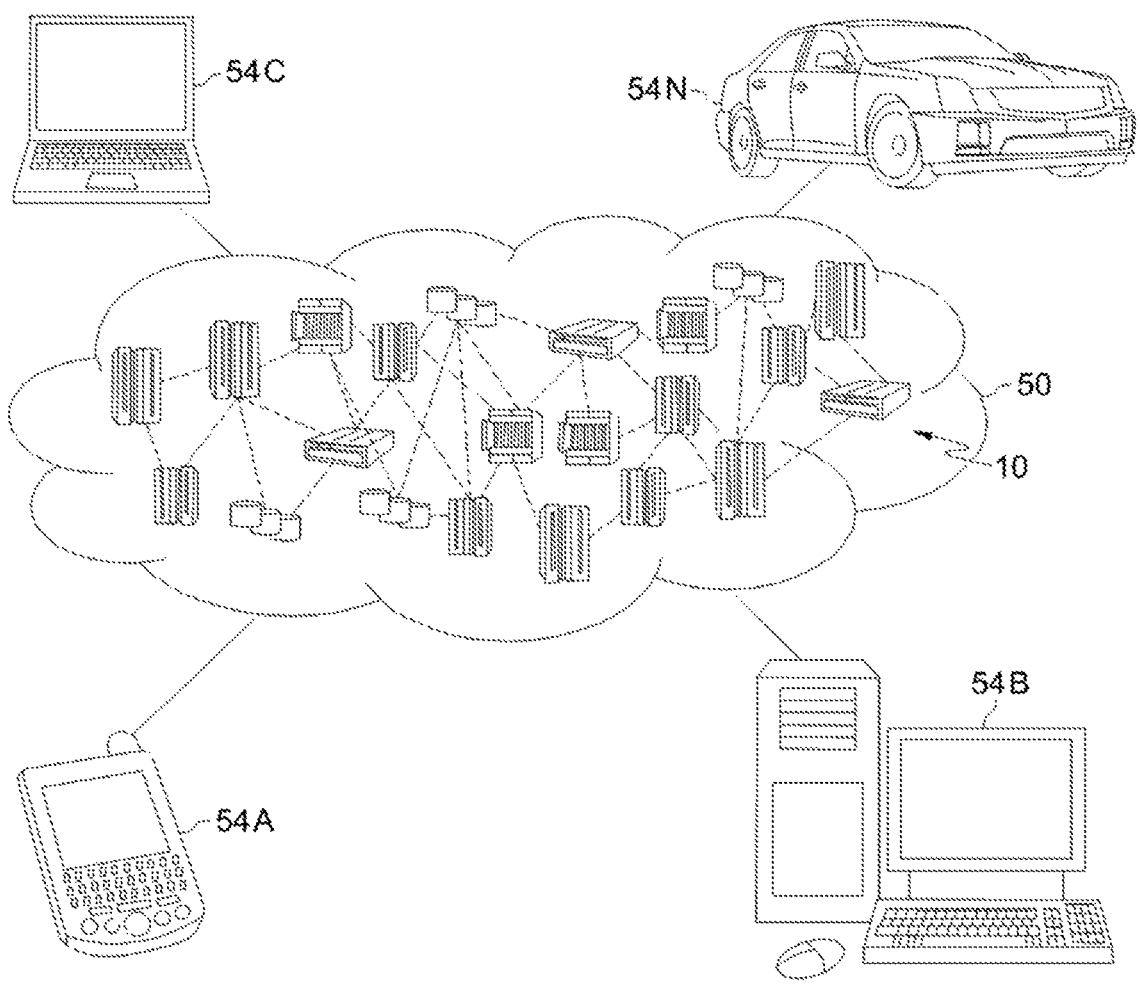
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
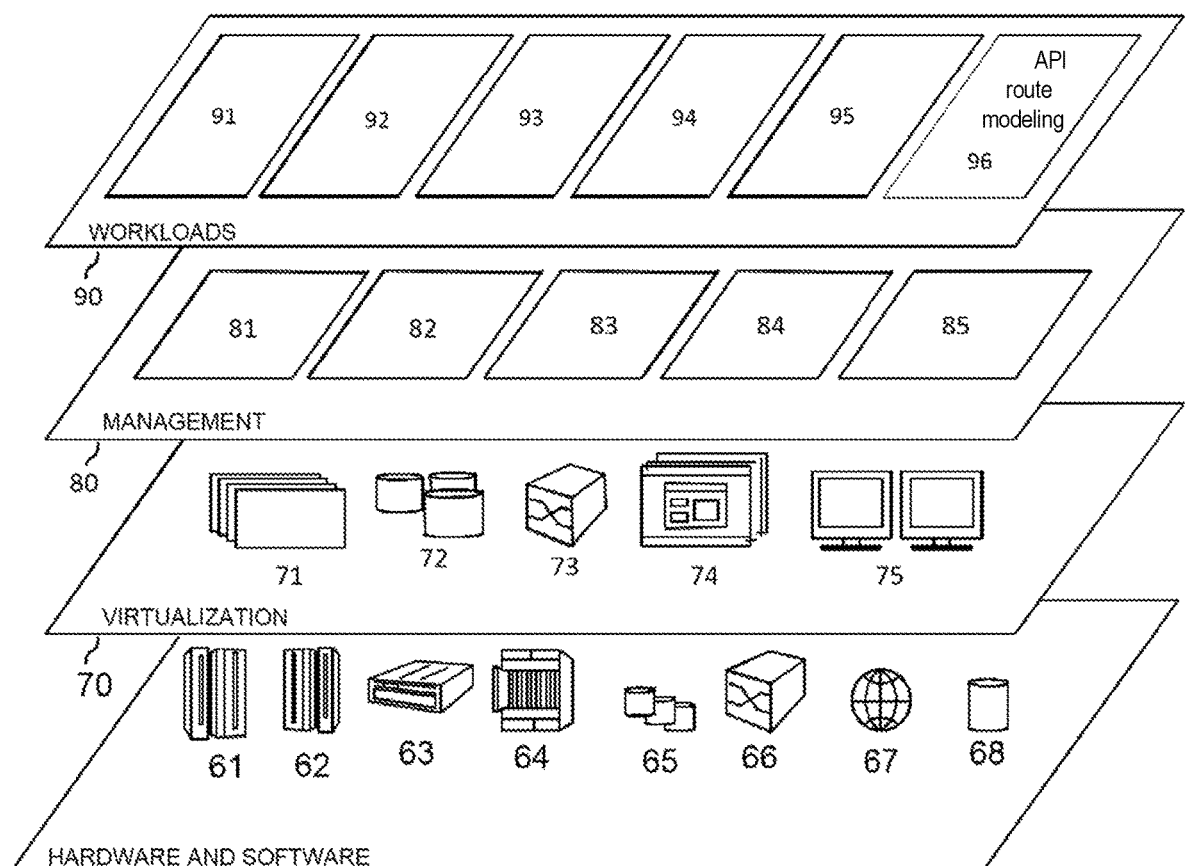
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API route modeling 96.

Implementations of the invention may include a computer system/server 12 of FIG. 1 in which one or more of the program modules 42 are configured to perform (or cause the computer system/server 12 to perform) one of more functions of the API route modeling 96 of FIG. 3. For example, the one or more of the program modules 42 may be configured to: observe a plurality of uniform resource locators (URLs); parse a URL path of each of the URLs into path segments; store the path segments into a tree structure, the tree structure having a plurality of nodes, each node representing a particular path segment of the path segments; determine a confidence factor for a first path in the tree structure using a decay function, the first path having an end node; and compact sibling nodes of the nodes into a compacted node in response to a number of the sibling nodes exceeding a sibling nodes threshold.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
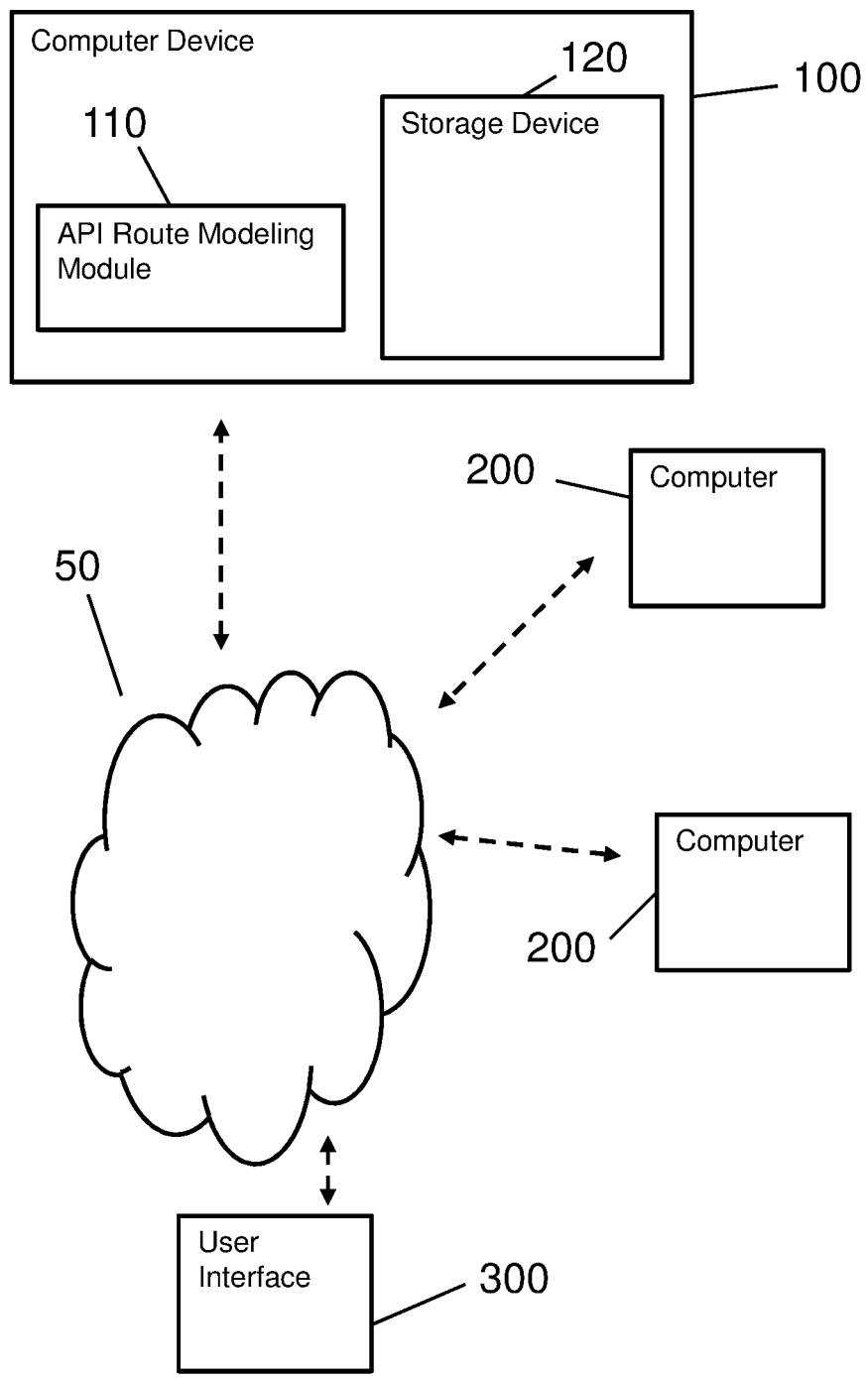
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks such as, for example cloud computing environment 50. In this example, computer device 100 includes an API route modeling module 110, for example, one or more of program modules 42 in FIG. 1, and a storage device 120 such as, for example, storage system 34 in FIG. 1.

FIG. 4 shows two computers 200 (other examples access fewer or more than two computers 200) such as, for example, desktop computer 54B or laptop computer 54C in FIG. 2, that contain webpages that have URLs. FIG. 4 shows a user interface 300 such as, for example, desktop computer 54B or laptop computer 54C in FIG. 2, that is, for example, a device used by a programmer to access API route modeling module 110 of computer device 100 over cloud computing environment 50. In embodiments, API route modeling module 110 performs methods described below.

In embodiments, API route modeling module 110 builds a tree structure by examining URLs of the traffic. In embodiments, API route modeling module 110 stores, in each node of the tree structure, a name and a counter. In embodiments, API route modeling module 110 establishes a list of model candidates, where each candidate has a path and a confidence factor. In embodiments, API route modeling module 110 sorts the candidates by confidence factor. In embodiments, API route modeling module 110 considers all candidates with a confidence factor above a threshold as models for APIs. In other embodiments, API route modeling module 110 considers all candidates with a confidence factor above a threshold and a total counter value above a threshold as models for APIs.

Figure 7:
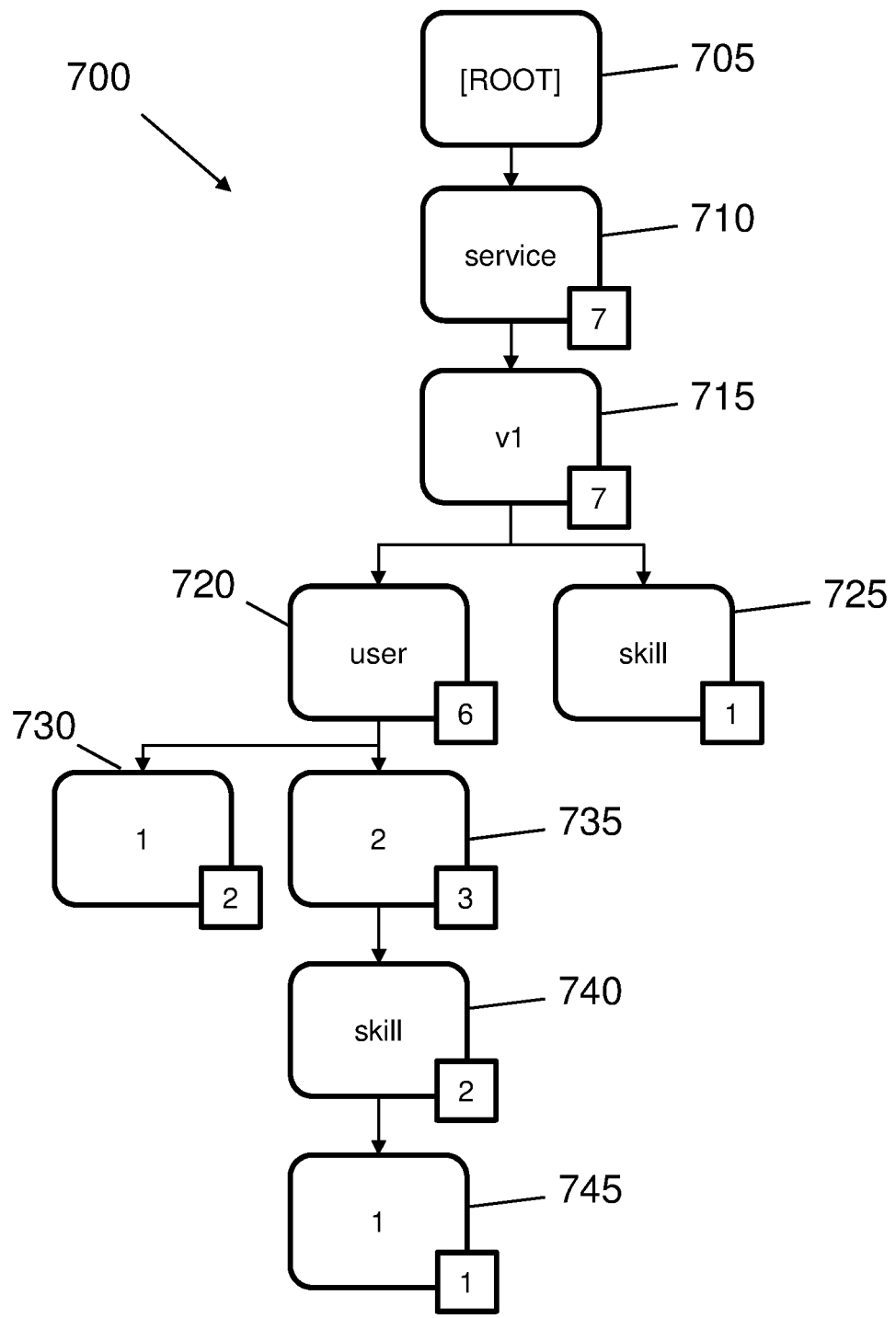
FIG. 7 shows a tree structure according to an embodiment of the invention.

In embodiments, API route modeling module 110 executes an algorithm for each URL observed to parse each URL into URL path segments. FIG. 5 shows seven examples of URLs observed by API route modeling module 110 in this example. API route modeling module 110 parses each URL into URL path segments and adds them to a tree structure such as, for example, tree structure 700 shown in FIG. 7. Each path segment in a URL represents a node in tree structure 700, where the parent of a node represents the preceding path segment. For example, API route modeling module 110 parses URL GET/service/v1/user/1 into "service" (node 710), "v1" (node 715), "user" (node 720), and "1" (node 730). API route modeling module 110 parses URL POST/service/v1/user into "service" (node 710), "v1" (node 715), and "user" (node 720). API route modeling module 110 parses URL GET/service/v1/user/2/skill/1 into "service" (node 710), "v1" (node 715), "user" (node 720), "2" (node 735), "skill" (node 740), and "1" (node 745). API route modeling module 110 parses the other URLs similarly into tree structure 700.

Each node other than ROOT node 705 has a counter. In this example, the counter of node 710 has a value of 7 because all seven URLs in FIG. 5 include the path segment "service". Similarly, the counter of node 720 has a value of 6 because only six of the seven URLs in FIG. 5 include the path segment "user". If a node with a particular segment name already exists under a parent node, API route modeling module 110 increments the counter for the node. If a node with a particular segment name does not exist in tree structure 700, API route modeling module 110 creates a new node with that name. API route modeling module 110 uses the value of the counter in calculating the confidence factor for each path (candidate). API route modeling module 110 calculates the confidence factor (described in more detail below) for the path to an end (or "leaf") node of the path, and stores the confidence factor along with the path in, for example, storage device 120.

In embodiments, API route modeling module 110 periodically runs a process that performs compaction of tree structure 700. Compaction is an attempt by API route modeling module 110 to consolidate nodes in tree structure 700 that have a high degree of variability and share the same parent. In the example shown in FIG. 7, nodes 730 and 735 are compacted into a single node (described in more detail below) having a wildcard name such as, for example "*".

In embodiments, API route modeling module 110 periodically runs a process that performs extraction of paths that have a confidence factor above a threshold. The extracted paths are called candidates. In embodiments, API route modeling module 110 select all paths having a confidence factor above a threshold (candidates), and then computes the sum of the counter value of each node in the path. If the sum of the counter values is above a threshold, API route modeling module 110 adds the full path of the candidate to the list of models of APIs.

Because performing a depth search first of tree structure 700 could be time consuming, API route modeling module 110 uses the confidence factor as a heuristic to determine which paths have seen enough examples to make a determination that API route modeling module 110 should extract a model. In embodiments, the name of the model is the path segment prior to the last wildcard '*' segment. For example, in embodiments, the path "/service/v1/user/*" has a model name of "user".

Embodiments of the invention support hierarchical models. In the event that a model exists that matches the prefix of another model, the former model is considered a parent of the latter model. From the above example, in an embodiment where the "user" model is "/service/v1/user/*", and the "skill" model is "/service/v1/user/*/skill/*", the model "skill" is a child of the model "user".

Embodiments of the invention include three phases: an observation phase; a compaction phase; and an extraction phase. Examples of each phase are described below with reference to FIGS. 5-9.

In embodiments, the observation phase has three steps: parsing URL paths into segments; updating the tree structure; and calculating confidence factors. As described above, FIG. 5 shows seven examples of URLs observed by API route modeling module 110 in this example. API route modeling module 110 parses each URL into URL path segments and adds them to tree structure 700 shown in FIG. 7. Each path segment in a URL represents a node in tree structure 700, where the parent of a node represents the preceding path segment. For example, API route modeling module 110 parses URL GET/service/v1/user/1 into "service" (node 710), "v1" (node 715), "user" (node 720), and "1" (node 730).

FIG. 6 shows an example of a decay function $N(t)$ that API route modeling module 110 uses to calculate the confidence factor for each path. In FIG. 6, $N_0$ is a counter value equal to a number of occurrences of a first node in the tree structure, e is Euler's number, $\lambda$ is a constant, t is a number of nodes that the first node is away from the end (leaf) node of the path. A purpose of the decay function is to control how much the frequency of higher nodes (segments) in tree structure 700 influences the reliability of model determination. In tree structure 700, higher nodes (those closer to the top of tree structure 700) generally have higher counter values than nodes farther down tree structure 700. If no decay function was applied, then the higher counter values of the higher nodes would overshadow the lower counter values of the lower nodes. In this example, $\lambda$ equals 0.5. However, different values can be used for $\lambda$. For example, the higher the value of $\lambda$, the faster the decay function approaches zero and the lesser the effect the nodes farther from the end node have on the confidence factor.

Figure 8:
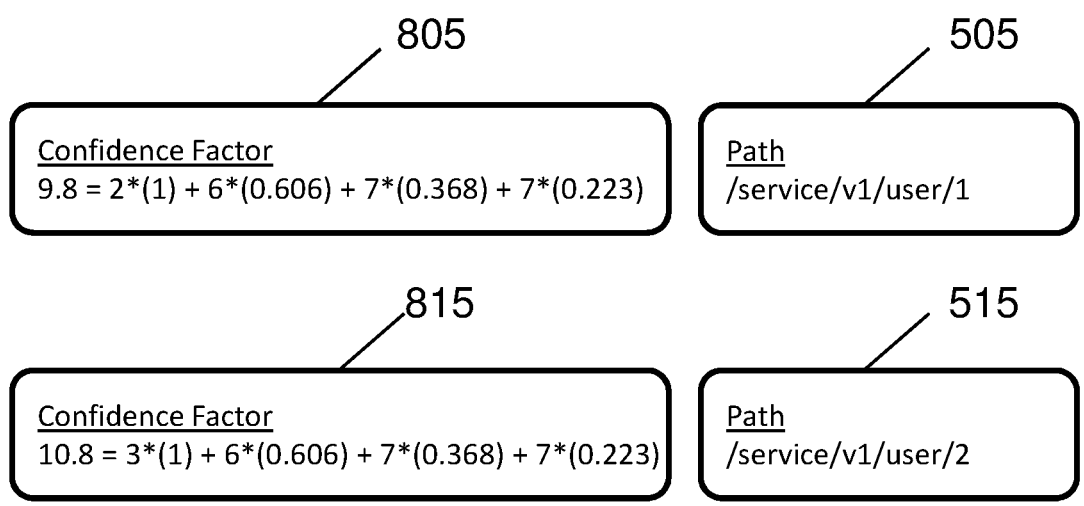
FIG. 8 shows exemplary calculations of confidence factors according to an embodiment of the invention.

FIG. 8 shows an example of the decay function of FIG. 6 being applied to URL 505 and URL 515 of FIG. 5 to calculate confidence factors. In the first example, confidence factor 805 equals 9.8 and is calculated from URL path 505 by summing the product of the counter value and decay function $N(t)$ for each node in the path. The counter value of node 730 (which is 2) is multiplied by the value of decay function $N(t)$ (which is 1) using relative level t=0 because node 730 is the end node of this path (and thus zero nodes away from the end node) (see the table in FIG. 6). Next, the counter value of node 720 (which is 6) is multiplied by the value of decay function $N(t)$ (which is 0.606) using relative level t=1 because node 720 is one node away from the end node 730 of this path. Next, the counter value of node 715 (which is 7) is multiplied by the value of decay function $N(t)$ (which is 0.368) using relative level t=2 because node 715 is two nodes away from the end node (730) of this path. Next, the counter value of node 710 (which is 7) is multiplied by the value of decay function $N(t)$ (which is 0.223) using relative level t=3 because node 710 is three nodes away from the end node (730) of this path. These four products are then added together to result in the confidence factor of URL path 505.

Still referring to FIG. 8, in this example, confidence factor 815 equals 10.8 and is calculated from URL path 515 by summing the product of the counter value and decay function $N(t)$ for each node in the path. The counter value of node 735 (which is 3) is multiplied by the value of decay function $N(t)$ (which is 1) using relative level t=0 because node 735 is the end node of this path (and thus zero nodes away from the end node) (see the table in FIG. 6). Next, the counter value of node 720 (which is 6) is multiplied by the value of decay function $N(t)$ (which is 0.606) using relative level t=1 because node 720 is one node away from the end node 735 of this path. Next, the counter value of node 715 (which is 7) is multiplied by the value of decay function $N(t)$ (which is 0.368) using relative level t=2 because node 715 is two nodes away from the end node (735) of this path. Next, the counter value of node 710 (which is 7) is multiplied by the value of decay function $N(t)$ (which is 0.223) using relative level t=3 because node 710 is three nodes away from the end node (735) of this path. These four products are then added together to result in the confidence factor of URL path 515.

Comparing confidence factor 805 (9.8) to confidence factor 815 (10.8) shows that there is more confidence that URL path 515 makes a good model than URL path 505 (because the confidence factor is a higher number). In this example, the higher confidence factor of URL path 515 (as compared to that of URL path 505) results from there being more URLs that include all of the path segments of URL path 515. URL paths 515, 520 and 525 include all of the path segments of URL path 515. Only URL paths 505 and 510 include all of the path segments of URL path 505.

Figure 9:
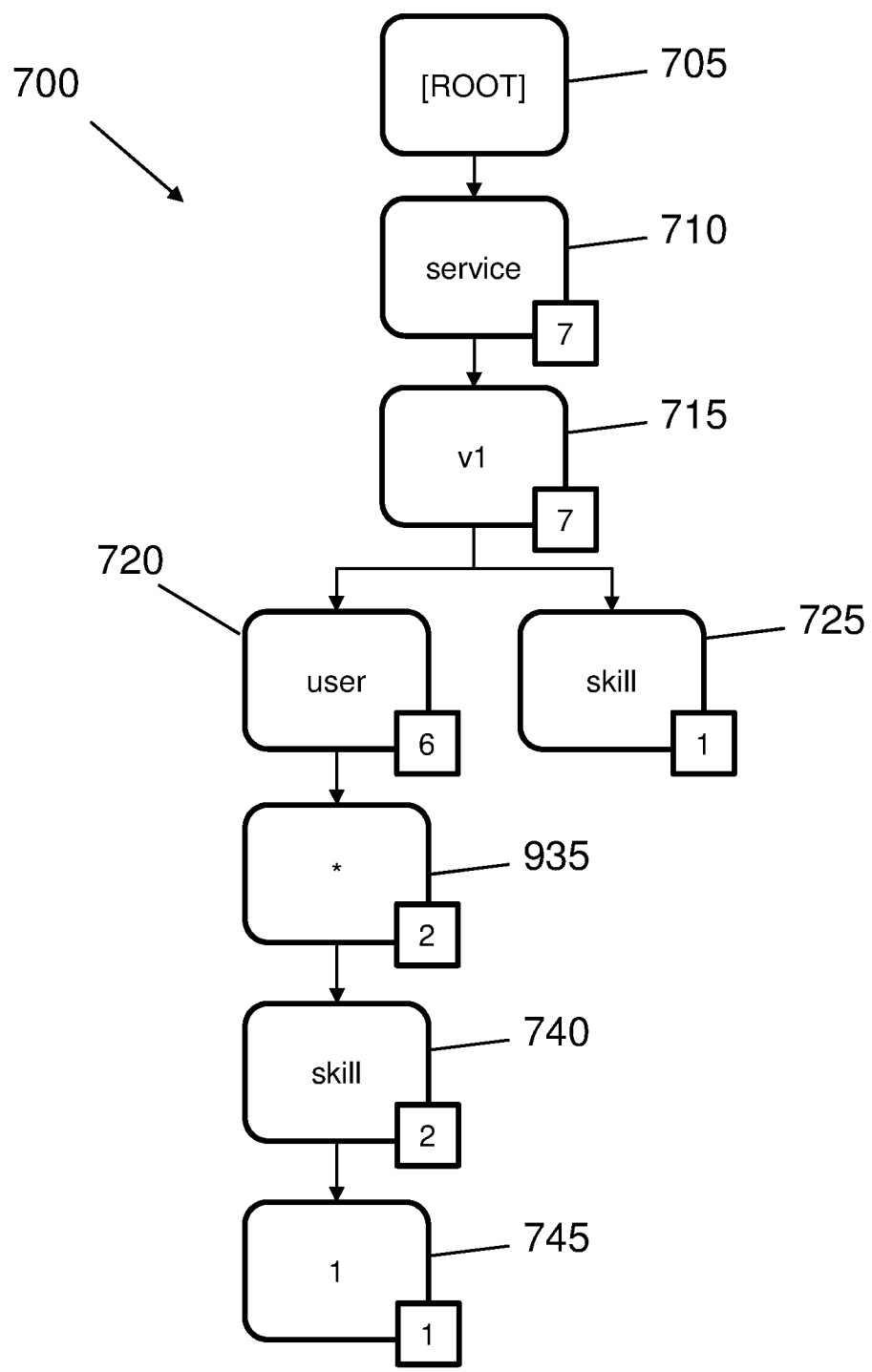
FIG. 9 shows a compacted tree structure according to an embodiment of the invention.

In the second phase of this example, tree structure 700 is compacted. In the compaction phase, API route modeling module 110 attempts to combine sibling nodes (nodes that have the same parent) into a single wild card node with the name "*". API route modeling module 110 compares the number of sibling nodes below a parent node to a variance threshold to determine if the sibling nodes should be replaced by a wild card node. In embodiments, if the number of sibling nodes is greater than the variance threshold, then API route modeling module 110 compacts the sibling nodes into a wild card node. FIG. 9 shows tree structure 700 after API route modeling module 110 has compacted sibling nodes 730 and 735 into node 935. In this example, the variance threshold is 1 and since the number of sibling nodes (2) exceeds the variance threshold (1), API route modeling module 110 compacts sibling nodes 730 and 735 into node 935. API route modeling module 110 sets the counter of node 935 equal to the number of nodes being replaced by node 935 (which is, in this case, 2).

As more traffic is observed (in the observation phase), the path segments of each of the URLs observed is added to tree structure 700. In embodiments, API route modeling module 110 increases the counter values by one when a new occurrence of an existing path segment is observed. In embodiments, API route modeling module 110 adds new nodes for new path segments (ones that do not already exist in tree structure 700) to tree structure 700 when such new path segments are observed. As part of the observation phase, if API route modeling module 110 has previously compacted tree structure 700, one or more nodes may have a wild card character, such as, for example, "*", for the node name in tree structure 700. In embodiments, API route modeling module 110 calculates the confidence factor in the same manner as described above, regardless of whether a node is a wild card node or a normal, uncompacted, node.

In embodiments, the third phase is the extraction phase. In the extraction phase, API route modeling module 110 selects paths that have a confidence factor that exceeds a confidence threshold (candidates). In embodiments, an operator of computer device 100 sets the confidence threshold such that only candidates that are observed in sufficient numbers are added as API models. API route modeling module 110 determines a name for each candidate that exceeds the confidence threshold if that path has not already been added as a model. In embodiments, API route modeling module 110 determines the name of the model by considering each path segment. Any "*" in the model name is replaced with "–>" unless the "*" is the last segment in the path. For example, in embodiments, API route modeling module 110 gives a path of "/service/v1/user/*/skill/*" the name of "user–>skill".

Figure 10:
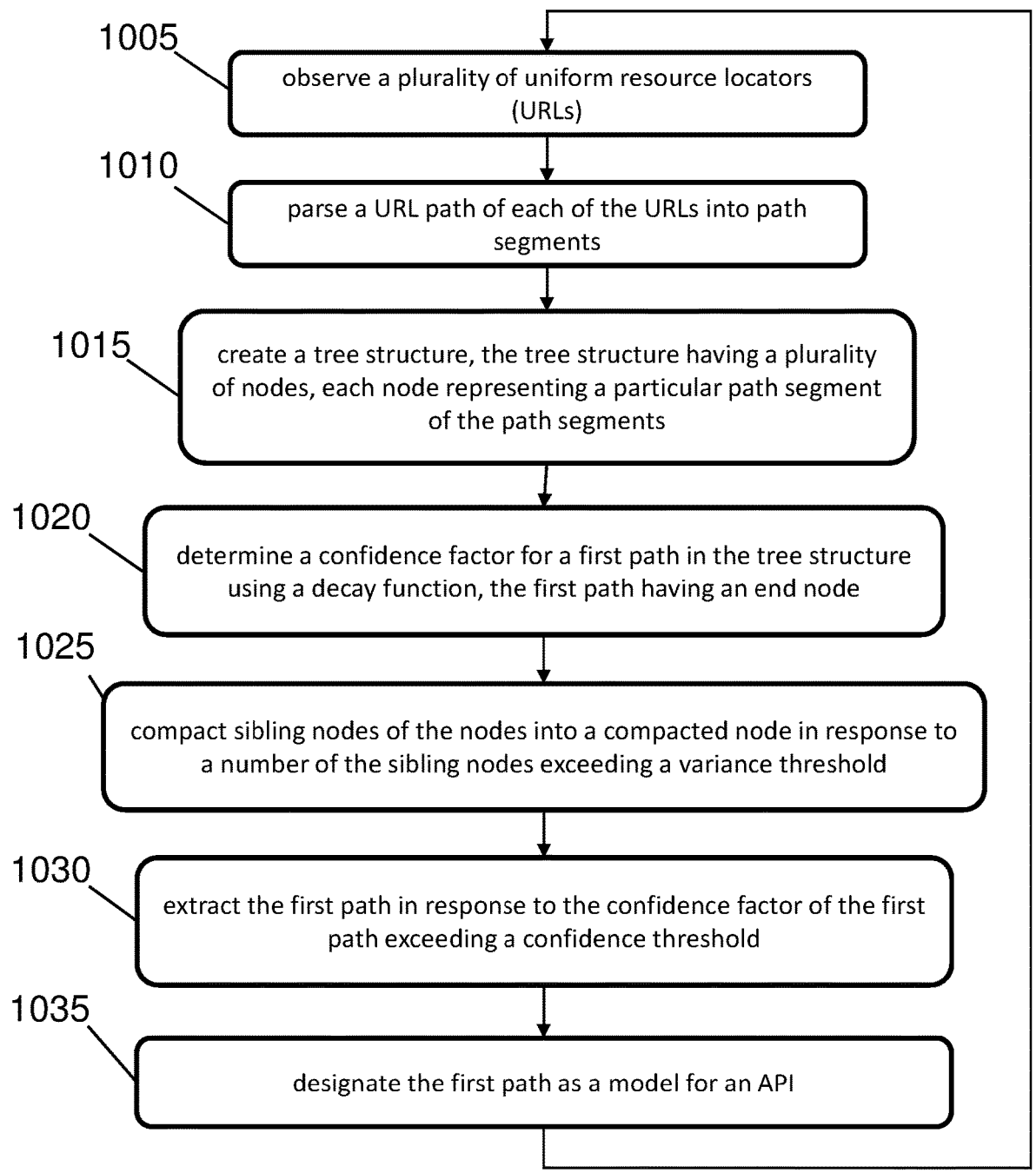
FIG. 10 shows a flow chart according to an embodiment of the invention.

FIG. 10 shows a flowchart of an exemplary method in accordance with aspects of the present invention. Steps of the method may be carried out in the environment of FIG. 4 and are described with reference to elements depicted in FIG. 4.

At step 1005, the system observes a plurality of uniform resource locators (URLs). In embodiments, and as described with respect to FIG. 4, API route modeling module 110 observes internet traffic in the form of a plurality of URLs. At step 1010, the system parses a URL path of each of the URLs into path segments. In embodiments, API route modeling module 110 parses the path of the URLs into the path segments shown in tree structure 700 shown in FIG. 7.

At step 1015, the system stores the path segments into a tree structure, the tree structure having a plurality of nodes, each node representing a particular path segment of the path segments. In embodiments, API route modeling module 110 stores the path segments in storage device 120 in the form of tree structure 700. At step 1020, the system determines a confidence factor for a first path in the tree structure using a decay function, the first path having an end node. In embodiments, API route modeling module 110 calculates confidence factor 805 for path 505 using the decay function shown in FIG. 6.

At step 1025, the system compacts sibling nodes of the nodes into a compacted node in response to a number of the sibling nodes exceeding a variance threshold. In embodiments, API route modeling module 110 compacts nodes 730 and 735 into node 935 when the number of sibling nodes (2) exceeds the variance threshold of 1.

At step 1030, the system extracts the first path in response to the confidence factor of the first path exceeding a confidence threshold. In embodiments, API route modeling module 110 extracts path 515 in response to confidence factor 815 exceeding a confidence threshold of 10.0. At step 1035, the system designates the first path as a model for an API. In embodiments, API route modeling module 110 designates path 515 as a model for an API.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
observing, by a computer device, a plurality of application programming interface (API) calls of uniform resource locators (URLs);
parsing, by the computer device, a URL path of each of the URLs into a single path segment of the URL path;
creating, by the computer device, a tree structure, the tree structure having a plurality of nodes, each node representing a particular path segment of the path segments;
determining, by the computer device, a count for each node of the plurality of nodes, the count for a respective node being a number of occurrences in the tree structure of the particular path segment represented by the respective node;
determining, by the computer device, a confidence factor for a first path in the tree structure using a decay function that limits effects of more frequent nodes found in the first path on the determined confidence factor, the first path having an end node, and the confidence factor being used as a heuristic to determine that the first path has the confidence factor above a threshold to make a determination that a model for an API is extracted; and
compacting, by the computer device, sibling nodes of the nodes into a compacted node in response to a number of the sibling nodes exceeding a variance threshold.

2. The computer-implemented method of claim 1, further comprising extracting, by the computer device, the first path in response to the confidence factor of the first path exceeding the threshold; and
designating, by the computer device, the first path as the model for the API.

3. The computer-implemented method of claim 2, further comprising adding, by the computer device, the first path to a list of candidate API models; and
sorting the list of candidate API models by the confidence factor to add to a list of models for the API.

4. The computer-implemented method of claim 2, wherein the first path is the model for the API that conforms to representational state transfer (REST) architectural constraints.

5. The computer-implemented method of claim 2, wherein the confidence threshold is a number of times a particular path is observed.

6. The computer-implemented method of claim 1, further comprising observing, by the computer device, additional URLs;
parsing, by the computer device, a URL path of each of the additional URLs into path segments;
combining, by the computer device, the path segments of the additional URLs into the tree structure;
determining, by the computer device, a revised confidence factor for the first path in the tree structure using the decay function; and
re-executing the compacting.

7. The computer-implemented method of claim 1, wherein the decay function determines a weight for each node in the first path, the weight being based on a distance of each node in the path from the end node.

8. The computer-implemented method of claim 7, wherein the weight of a first node in the first path is less than a weight of a second node in the first path as a result of the first node being farther from the end node than the second node is from the end node.

9. The computer-implemented method of claim 8, wherein the weight of the first node in the first path is calculated using the formula $N0e^{-\lambda t}$, where N0 is the count of the first node in the tree structure, e is Euler's number, $\lambda$ is a constant, t is a number of nodes that the first node is away from the end node.

10. The computer-implemented method of claim 9, wherein $\lambda$ equals 0.5.

11. The computer-implemented method of claim 1, wherein the creating comprises recording a name and the count for each of the plurality of nodes.

12. The computer-implemented method of claim 1, wherein the computer device includes software provided as a service in a cloud computing environment.

13. The computer-implemented method of claim 1, wherein the computer device determines the confidence factor for the first path using the count of each node in the first path.

14. A computer program product, the computer program product comprising one or more computer readable storage media having program instructions collectively stored on the one or more computer readable storage media, the program instructions executable to:
observe a plurality of representational state transfer (REST) application programming interface (API) calls of uniform resource locators (URLs);
parse a URL path of each of the URLs into path segments;
create a tree structure, the tree structure having a plurality of nodes, each node representing a particular path segment of the path segments;
determine a confidence factor for a first path in the tree structure using a decay function, the first path having an end node; and
compact sibling nodes of the nodes into a compacted node in response to a number of the sibling nodes exceeding a variance threshold,
wherein the decay function determines a weight for each node in the first path, the weight being based on a distance of each node in the path from the end node, and
the weight of the first node in the first path is calculated using the formula $N0e^{-\lambda t}$, where N0 is a counter value equal to a number of occurrences of the first node in the tree structure, e is Euler's number, $\lambda$ is a constant, t is a number of nodes that the first node is away from the end node.

15. The computer program product of claim 14, further comprising program instructions executable by the computing device to cause the computing device to:
observe additional URLs;
parse a URL path of each of the additional URLs into path segments;
combine the path segments of the additional URLs into the tree structure;
determine a revised confidence factor for the first path in the tree structure using the decay function; and
re-execute the compacting.

16. The computer program product of claim 14, further comprising program instructions executable by the computing device to cause the computing device to:
extract the first path in response to the confidence factor of the first path exceeding a confidence threshold; and
designate the first path as a model for an application user interface (API).

17. A system comprising:
a processor, a computer readable memory, and a computer readable storage medium;
program instructions to observe a plurality of representational state transfer (REST) application programming interface (API) calls of uniform resource locators (URLs);
program instructions to parse a URL path of each of the URLs into a single path segment of the URL path;
program instructions to create a tree structure, the tree structure having a plurality of nodes, each node representing a particular path segment of the path segments;
program instructions to determine a count for each node of the plurality of nodes, the count for a respective node being a number of occurrences in the tree structure of the particular path segment represented by the respective node;
program instructions to determine a confidence factor for a first path in the tree structure using a decay function, the first path having an end node that limits effects of more frequent nodes found in the first path on the determined confidence factor; and
program instructions to compact sibling nodes of the nodes into a compacted node in response to a number of the sibling nodes exceeding a variance threshold, the compacted node comprising a single wildcard node,
wherein the program instructions are stored on the computer readable storage medium for execution by the processor via the computer readable memory.

18. The system of claim 17, further comprising program instructions to observe additional URLs;
program instructions to parse a URL path of each of the additional URLs into path segments;
program instructions to combine the path segments of the additional URLs into the tree structure;
program instructions to determine a revised confidence factor for the first path in the tree structure using the decay function; and
program instructions to re-execute the compacting.

19. The system of claim 18, wherein the program instructions to create the tree structure and the program instructions to combine the path segments of the additional URLs into the tree structure further comprise:
program instructions to record a name and the count for each of the plurality of nodes.

20. The system of claim 17, wherein the confidence factor for the first path is determined using the count of each node in the first path, and
wherein the decay function determines a weight for each node in the first path, the weight being based on a distance of each node in the path from the end node, and the weight of the first node in the first path is calculated using the formula $N0e^{-\lambda t}$, where $N0$ is a counter value equal to a number of occurrences of the first node in the tree structure, $e$ is Euler's number, $\lambda$ is a constant, $t$ is a number of nodes that the first node is away from the end node.

* * * * *